Patented July 4, 1933

1,916,302

UNITED STATES PATENT OFFICE

LEO P. CURTIN, OF CRANBURY, NEW JERSEY

PROCESS FOR THE RECOVERY OF LEAD DIRECTLY FROM LEAD ORE IN THE FORM OF AN ACETATE OF LEAD

No Drawing.       Application filed October 23, 1931.  Serial No. 570,773.

My invention relates to a process for the recovery of lead in the form of an acetate thereof, directly from lead ores; that is to say, without the intermediate production or recovery of metallic lead.

Present day methods for the manufacture of lead salts from the lead ores involve first smelting the ore for the production of metallic lead, then oxidizing the lead to lead oxid (PbO), and then converting the lead oxid to soluble lead salts, such as the nitrate or acetate, by dissolving it in nitric or acetic acid, and finally, if insoluble compounds such as the chromate are desired, reacting the soluble lead salt with a soluble chromate. As stated above the purpose of my invention is to avoid the intermediate production of metallic lead.

The principal source of lead is galena ore, the principal constituent of which is lead sulfid, PbS, and the invention will be described and illustrated with reference to the use of galena lead ore as the starting material, but it will be understood that the process is applicable to other lead ores and crude, lead-bearing materials containing sulfur.

In accordance with my invention the ore is first roasted in accordance with the well-known so-called air-reduction process of lead smelting, with regulation of the roasting temperature and the air supply to yield a product containing lead oxid, lead sulfate and lead basic sulfate. It is usually desirable to so conduct the roasting operation that the ratio of lead oxid to lead sulfate is as high as is economically possible, i. e. until from about 65 to about 80% of the lead content of the ore is present as oxid. The sulfur removed from the ore by the roasting appears principally as sulfur dioxide, which may be saved, e. g. by using it for the manufacture of sulfuric acid.

The roasted ore consisting principally of lead sulfate, lead oxid, basic lead sulfate and gangue matter, is quite resistant to most solvents, and it has not been possible heretofore economically to recover its lead content in this manner. Lead acetate, as is well known, will dissolve lead oxid quite readily, but it will not dissolve lead sulfate. On the other hand, ammonium salts and certain acetates and chlorides will dissolve the lead sulfate, but only small quantities of the lead oxid. The basic lead sulfate is particularly resistant to solution in these solvents.

In accordance with the present invention, by the use of a combination of solvents the lead content of the roasted ore can be almost quantitatively dissolved and recovered. My preferred procedure is as follows:

The roasted ore is first extracted with a solution of lead acetate. A cold saturated solution of lead acetate will dissolve from the ore-lead oxid equivalent to one part by weight of metallic lead to ten parts by weight of the lead acetate solution. The amount of lead sulfate dissolved by the lead acetate solution is negligible. Hot saturated lead acetate solution will dissolve from the ore-lead oxid equivalent to more than one part of metallic lead to five parts of the lead acetate solution, but its solvent action on the lead sulfate is no better than that of the cold solution. The lead acetate solution may, therefore, be used either hot or cold for dissolving the lead oxid content of the roasted ore.

The residue of the lead acetate extraction is then extracted with a calcium acetate solution. A calcium acetate solution will dissolve pure normal lead sulfate equivalent to about five parts by weight of metallic lead in cold solution and seven parts by weight of metallic lead in hot solution per one hundred parts by weight of solution. In dissolving lead from the residue of the extraction of the ore with lead acetate the solubility of the lead is somewhat less, being about 2.8 parts for cold solution and about 4.2 parts for hot solution. In general the better is the extraction of the oxid by the lead acetate solution the better will be the extraction of the sulfate with the calcium acetate solution. Calcium acetate is of little value for the extraction of mixtures of lead oxid and lead sulfate due to the tendency of these two compounds to form basic lead sulfate which is practically insoluble in the calcium acetate solution. Consequently the removal of lead oxid from the roasted ore preliminary to the calcium acetate extraction is practically essential. As will be apparent from the foregoing statements regarding solubilities, the lead acetate solution may be used either hot or cold, but it is preferable to use the calcium acetate solution hot. Another factor to be considered in this connection is that when the lead acetate solution is used hot the extraction treatment seems to favor the formation of basic lead sulfate, which is unusually resistant to solution by the calcium acetate solution. This difficulty may be avoided by using the lead acetate solution cold or by the addition of a small amount of free acetic acid to the calcium acetate solution employed for the extraction. In any event, whether as a result of a hot lead acetate solution extraction or some other cause, the residue contains basic lead sulfate, the extraction of lead with the calcium acetate solution is favored by the presence of free acetic acid. Either or both the lead acetate and the calcium acetate extractions may be repeated, it being desirable ordinarily to extract the ore at least twice with each solvent. The residue is then washed with water. The washed residue consists mainly of gypsum and may be discarded unless the ore contains silver and other noble metals, in which case these will be present in the residue and may be recovered therefrom comparatively simply because the residue is practically free of lead.

The recovery of the lead from the lead acetate and calcium acetate solutions and/or its conversion into the desired lead salts involves no difficulties. The lead oxid dissolved in the lead acetate solution forms basic lead acetate and may readily be precipitated by means of carbon dioxide as basic or normal lead carbonate. The lead carbonate may in turn be converted into lead monoxid by heating to 400–475° C. and it can be converted into the higher oxids as is well known. Or the lead carbonate or the oxid derived therefrom may be dissolved in acids, such as nitric and acetic, to form soluble lead salts, and eventually converted into other salts, such as the chromate, as described above. The residual solution from which the lead has been precipitated by means of carbon dioxid may be used in a repetition of the process, or its lead content may be converted into the desired lead compound and fresh lead acetate solution supplied for the first step of the process.

The lead is best recovered from the calcium acetate solution by precipitation in the form of an insoluble salt, such as the chromate or arsenate. If arsenic acid or chromic acid or even dichromate is used for this purpose, free acetic acid will be liberated in the solution and may be distilled out and recovered or neutralized with lime, forming more calcium acetate for use in the process.

It will be observed from the foregoing disclosure that the essential features of the process are the removal of lead oxid from the calcined ore by means of lead acetate solution, followed by the extraction of the lead content of the ore present as sulfate. It is best to employ the lead acetate and calcium acetate solutions separately, although it is possible to combine these solvents and let them act simultaneously on the ore. By so doing considerable manipulation is avoided, but at the same time the speed and completeness of the action of the solvents on the ore is impaired.

Other solvents of lead sulfate, such as ammonium acetate, may be substituted wholly or in part for the calcium acetate, although in general I have found it to be most advantageous to use the calcium acetate, and I recognize that it may be possible to substitute other solvents of lead oxid for the lead acetate solution without departing from the spirit of my invention. Other ores of lead than galena ore, such as those containing cerrusite and anglesite, may of course be treated.

I claim:

1. Process for the recovery of lead in combined form from lead ores which comprises subjecting the roasted ore to the solvent action of lead acetate and calcium acetate in aqueous solution.

2. Process for the recovery of lead in combined form from a material comprising lead oxid and lead sulfate which comprises dissolving the lead oxid content thereof with lead acetate solution and dissolving the lead sulfate with a solvent therefor of the group consisting of aqueous solutions of calcium acetate and ammonium acetate.

3. Process for the recovery of lead in combined form from an ore comprising galena which comprises roasting the ore whereby to convert the lead content thereof into a mixture of lead oxid, lead sulfate, and basic lead sulfate, extracting the ore with lead acetate solution to remove lead oxid and thereafter extracting the residue with calcium acetate solution.

4. Process as defined in claim 3 in which a saturated cold lead acetate solution is employed.

5. Process as defined in claim 3 in which a hot calcium acetate solution is employed.

6. Process as defined in claim 3 in which a calcium acetate solution acidified with acetic acid is employed.

7. Process as defined in claim 3 in which the roasted ore is repeatedly extracted with cold saturated lead acetate solution, then repeatedly extracted with hot calcium acetate solution.

In testimony whereof, I affix my signature.

LEO P. CURTIN.